(12) United States Patent
Dang et al.

(10) Patent No.: US 8,789,956 B2
(45) Date of Patent: Jul. 29, 2014

(54) OPTICAL SYSTEM FOR SHAPING A LASER BEAM AND LASER SYSTEM HAVING SUCH AN OPTICAL SYSTEM

(75) Inventors: Lieu-Kim Dang, Gams (CH); Stefan Barth, Feldkirch (AT)

(73) Assignee: Hilti Aktiengesellschaft, Schaan (LI)

( * ) Notice: Subject to any disclaimer, the term of this patent is extended or adjusted under 35 U.S.C. 154(b) by 2 days.

(21) Appl. No.: 13/333,601

(22) Filed: Dec. 21, 2011

(65) Prior Publication Data

US 2012/0188645 A1    Jul. 26, 2012

(30) Foreign Application Priority Data

Dec. 22, 2010   (DE) .......................... 10 2010 063 924

(51) Int. Cl.
*G02B 5/08*    (2006.01)

(52) U.S. Cl.
USPC ............................. 359/850; 359/558; 362/343

(58) Field of Classification Search
USPC .............. 359/558, 850, 223.3, 618, 641, 822; 362/259, 341, 343; 372/93, 26, 8, 101
See application file for complete search history.

(56) References Cited

U.S. PATENT DOCUMENTS

| | | | |
|---|---|---|---|
| 4,111,564 A | 9/1978 | Trice, Jr. | |
| 5,644,400 A | 7/1997 | Mundt | |
| 5,884,995 A * | 3/1999 | Perlo et al. ..................... | 362/327 |
| 6,542,304 B2 * | 4/2003 | Tacklind et al. ............... | 359/618 |
| 6,751,879 B1 * | 6/2004 | Pu .................................. | 33/286 |
| 2004/0085646 A1 | 5/2004 | Tacklind et al. | |
| 2004/0107588 A1 | 6/2004 | Pu | |
| 2005/0068626 A1 * | 3/2005 | Dang et al. ..................... | 359/566 |
| 2005/0091859 A1 * | 5/2005 | Pu ..................................... | 33/281 |
| 2006/0091429 A1 * | 5/2006 | Kim et al. ...................... | 257/257 |
| 2006/0109556 A1 * | 5/2006 | Guldevall ....................... | 359/631 |
| 2008/0165433 A1 | 7/2008 | Perchak | |
| 2011/0280017 A1 | 11/2011 | Dang | |
| 2012/0327662 A1 * | 12/2012 | Dang et al. ..................... | 362/259 |

FOREIGN PATENT DOCUMENTS

| | | | | |
|---|---|---|---|---|
| DE | 10 2009 000 590 A1 | 8/2010 | | |
| DE | 102009000590 A1 * | 8/2010 | ............. | G02B 26/02 |
| DE | 10 2010 028 794 A1 | 11/2011 | | |
| EP | 0 767 393 A2 | 4/1997 | | |
| EP | 1 296 163 A2 | 3/2003 | | |
| WO | WO 2004/044641 A1 | 5/2004 | | |

OTHER PUBLICATIONS

German Search Report, dated Aug. 22, 2011, 3 pages.
European Search Report, dated Mar. 7, 2012, 7 pages total.
Dang, Lieu-Kim; "Optical System for Shaping a Laser Beam and Laser System Having Such an Optical System"; (32 pages); Appln. Filing Date—Dec. 21, 2011.
European Search Report, dated Jul. 30, 2012, 13 pages total.

* cited by examiner

*Primary Examiner* — Arnel C Lavarias
(74) *Attorney, Agent, or Firm* — Crowell & Moring LLP (57) ABSTRACT

An optical system for shaping a laser beam includes an optical element with a base member having a lower base, an upper base, and a lateral surface. The lateral surface includes a transmitting surface for the laser beam, and the base member includes a first cutout portion having a lower base arranged in the upper base of the base member, and a lateral surface that has a first reflecting surface for the laser beam and generates an at least segmentally ring-shaped laser beam. The base member includes a second cutout portion having a lower base arranged in the lower base of the base member, an upper base that includes a transmitting surface for the laser beam, and a lateral surface abutting the lower and upper base. The lateral surface includes a second reflecting surface for the at least segmentally ring-shaped laser beam.

10 Claims, 4 Drawing Sheets

OPTICAL SYSTEM FOR SHAPING A LASER BEAM AND LASER SYSTEM HAVING SUCH AN OPTICAL SYSTEM

This application claims the priority of German Patent Document No. 10 2010 063 924.9, filed Dec. 22, 2010, the disclosure of which is expressly incorporated by reference herein.

BACKGROUND AND SUMMARY OF THE INVENTION

The present invention relates to an optical system for shaping a laser beam and to a laser system having such an optical system.

When incident on an interface, a laser beam is generally split into three parts: a first part is reflected at the interface (reflected laser beam), a second part passes through the interface into the second optical medium (transmitted laser beam) and a third part is absorbed at the interface (absorbed laser beam). An interface is defined as a surface that is arranged between two media of different refractive indices. An interface at which a laser beam predominantly passes from a first into a second optical medium is referred to as a transmitting surface. An interface at which a laser beam is predominantly deflected within an optical medium is referred to as a reflecting surface. The respective fractions of the reflected, transmitted and absorbed laser beam can be modified, for example, via the wavelength and/or the angle of incidence of the incident laser beam and/or via a coating of the interface.

German Patent Document No. DE 10 2010 028 794 discloses an optical system for shaping a laser beam, comprising a first optical element that is designed, at least in some segments thereof, as a base member having a lower base, an upper base parallel to the lower base, and a lateral surface abutting the lower and upper bases. The lateral surface of the base member is designed, at least in some segments thereof, as a transmitting surface for the laser beam. The base member comprises a first cutout portion having a lower base that is arranged in the upper base of the base member, and a lateral surface that is designed, at least in some segments thereof, as a first reflecting surface for the laser beam An incident laser beam is deflected at the lateral surface of the first cutout portion, which lateral surface forms the first reflecting surface, and reshaped into a ring-shaped laser beam. In order to be able to generate on a target surface a horizontal line-shaped laser mark, it is necessary for the incident laser beam to be deflected through 90°. The known optical system for shaping a laser beam makes it possible to generate a line-shaped laser mark on a target surface without requiring much aligning effort. A shortcoming lies in that the optical system is sensitive to tilting of the first reflecting surface relative to the incident laser beam.

The aim of the present invention is therefore to develop an optical system for shaping a laser beam and a laser system having such an optical system, in which the aligning effort is further reduced and which additionally is insensitive to tilting of the reflecting surface relative to the incident laser beam.

According to the present invention, it is provided that the base member comprises a second cutout portion having a lower base that is arranged in the lower base of the base member, an upper base that is designed at least in some segments thereof as a transmitting surface for the laser beam, and a lateral surface abutting the lower and upper bases, the lateral surface being designed at least in some segments thereof as a second reflecting surface for the at least segmentally ring-shaped laser beam. The angle between the first reflecting surface and the lower base of the first cutout portion, and the angle between the second reflecting surface and the lower base of the second cutout portion are aligned relative to one another in such a way that an incident laser beam is deflected through 90°.

The optical element according to the invention has a first and a second reflecting surface for the laser beam, wherein the lateral surface of the first cutout portion that is arranged in the upper base forms the first reflecting surface and the lateral surface of the second cutout portion that is arranged in the lower base forms the second reflecting surface. Owing to the double reflection of the laser beam, the optical system according to the invention is insensitive to tilting of the first reflecting surface relative to the incident laser beam. The first and the second reflecting surfaces are integrated into the base member of the optical element, such that the alignment of the first and second reflecting surfaces relative to each other takes place during production of the first and second cutout portion in the base member and only one optical mount is required.

In order to generate on a target area a line-shaped laser mark that is closed over 360°, all bounded surfaces in which the directional derivative of the bounding line is continuous may be used as suitable bases for the base member. If the directional derivative is not continuous at any point, the ring-shaped laser beam is interrupted and the line-shaped laser mark on a target surface is therefore not closed over the entire circumference of the mark. In applications in which a closed laser mark is not required, it is possible to use bases in which the directional derivative of the bounding line is discontinuous at one or more points, like in a polygonal base, in which the directional derivative of the bounding line is continuous in the area of the sides and not continuous in the area of the corner points.

In a preferred embodiment, a further optical element is provided that is integrated into the lateral surface of the base member, into the lateral surface of the first cutout portion, into the upper base of the second cutout portion, and/or into the lateral surface of the second cutout portion. The term "integrated" means that no interface exists between the base member and the further optical element. The optical element according to the invention has four interfaces between a first optical medium which is the base member, and a second optical medium which is the surrounding environment. These interfaces are utilized in order to integrate further optical elements into the base member. This embodiment has the advantage that the alignment of the optical elements takes place during manufacturing of the optical system and that only one optical mount is required.

Particularly preferably, the further optical element is designed as a diffractive optical element. Diffractive optical elements split an incident laser beam into different orders of diffraction according to the angle and have the advantage that laser beams can be shaped into nearly any desired beam distribution. A diffractive optical element can be created retroactively in a base member by scanning texturing methods, such as diamond turning, laser- or electron writing. This embodiment has the advantage that the alignment of the optical elements takes place during manufacturing of the optical system and that only one optical mount is required.

In a further preferred embodiment a further optical element is provided that directly abuts the lateral surface of the base member, the lateral surface of the first cutout portion, the upper base of the second cutout portion, and/or the lateral surface of the second cutout portion. The term "directly abutting" means that the base member and the further optical element have a common interface, and no other optical element or medium having a different refractive index, such as for example air, is located between the optical surfaces of the two optical elements. This embodiment has the advantage that it allows two different materials to be combined, and the properties of the optical system can thus be adapted to the given requirements in a more flexible and improved manner. Despite different optical materials, only one optical mount is required and the alignment of the two optical elements takes place during manufacturing, rather than at a later time.

In a preferred embodiment, the at least one further optical element is designed as a beam-shaping optical element that shapes the laser beam in a plane perpendicular to a propagation direction of the laser beam. The laser beam can be shaped, for example, with the aid of collimating optics or focusing optics.

In a further preferred embodiment the at least one further optical element is designed as a beam-shaping optical element that shapes the at least segmentally ring-shaped laser beam in a plane perpendicular to a propagation plane. This embodiment has the advantage that a narrow line-shaped laser mark can be generated on a target surface. The ring-shaped laser beam can be shaped, for example, with the aid of collimating optics or focusing optics.

In a further preferred embodiment the at least one further optical element is designed as a beam-shaping optical element that shapes the at least segmentally ring-shaped laser beam in a plane parallel to a propagation plane of the ring-shaped laser beam. This embodiment has the advantage that spot-shaped laser marks can be generated on a target surface, in addition to a line-shaped laser mark. Diffractive optical elements shape a laser beam in such a way that the zero order of diffraction of the laser beam generates on the target surface a line-shaped laser mark and the higher orders of diffraction, in particular the first order of diffraction, generate spot-shaped laser marks. The spot-shaped laser marks can enclose between them a defined angle and may be used, for example, to transfer angles from one target surface to another target surface. This application expands the spectrum of applications of the optical system according to the invention.

In a preferred embodiment, the first cutout portion of the base member has an upper base that is parallel to the lower base, which upper base is designed at least in some segments thereof as a transmitting surface for the laser beam. This embodiment has the advantage that a spot-shaped plumb beam is generated in addition to the line beam. The beam shape of the plumb beam can be adjusted via an optical element that is integrated into or directly abuts the upper base. A collimated or focused plumb beam can be generated by collimating or focusing optics.

Also proposed is a laser system comprising a beam source for generating a laser beam and comprising the optical system according to the invention. Preferably, an adjustment device is provided whereby the position of the beam source relative to the optical system and/or the position of the optical system relative to the beam source are adjustable in a propagation direction of the laser beam and/or in a plane perpendicular to the propagation direction of the laser beam. The ability to adjust between the beam source and the optical system has the advantage that the opening angle of the ring-shaped laser beam can be adapted to the measuring task at hand and the available intensity of the beam source can be optimally utilized.

In a preferred embodiment of the laser system, a first optical system which generates a first at least segmentally ring-shaped laser beam, and at least one further optical system that generates a further at least segmentally ring-shaped laser beam are provided. Particularly preferred is a third optical system which produces a third at least segmentally ring-shaped laser beam. The ring-shaped laser beams are arranged perpendicular to one another or at a specified angle. In a further preferred embodiment of the laser system, at least one optical system is designed in such a way that a spot-shaped laser beam is generated in addition to an at least segmentally ring-shaped laser beam.

Embodiments of the invention will be described below with reference to the drawings. The drawings are not necessarily intended to show the embodiments true to scale, but instead the drawings are rendered, where expedient for explanation purposes, in schematic and/or slightly distorted form. With regard to teachings readily apparent from the drawings, reference is hereby made to the pertinent prior art for further details. One should bear in mind that a great variety of modifications and changes can be made with respect to the form and detail of an embodiment without departing from the general idea of the invention. The features of the invention that are disclosed in the description, in the drawings and in the claims may be essential for further enhancement of the invention, by themselves and/or in any combination thereof. Furthermore, the scope of the invention also covers any and all combinations of at least two of the features disclosed in the description, in the drawings and/or in the claims. The general idea of the invention is not limited to the exact form or detail of the embodiments shown and described hereinbelow, nor limited to a subject matter that would be limited when compared to the subject matter as claimed in the claims. Where dimensional ranges are given, values that lie within the stated limits shall be usable and claimable also as threshold values. For reasons of simplicity, like reference symbols are used hereinbelow for identical or similar elements or elements of identical or similar function.

DETAILED DESCRIPTION OF THE DRAWINGS

Figure 1:
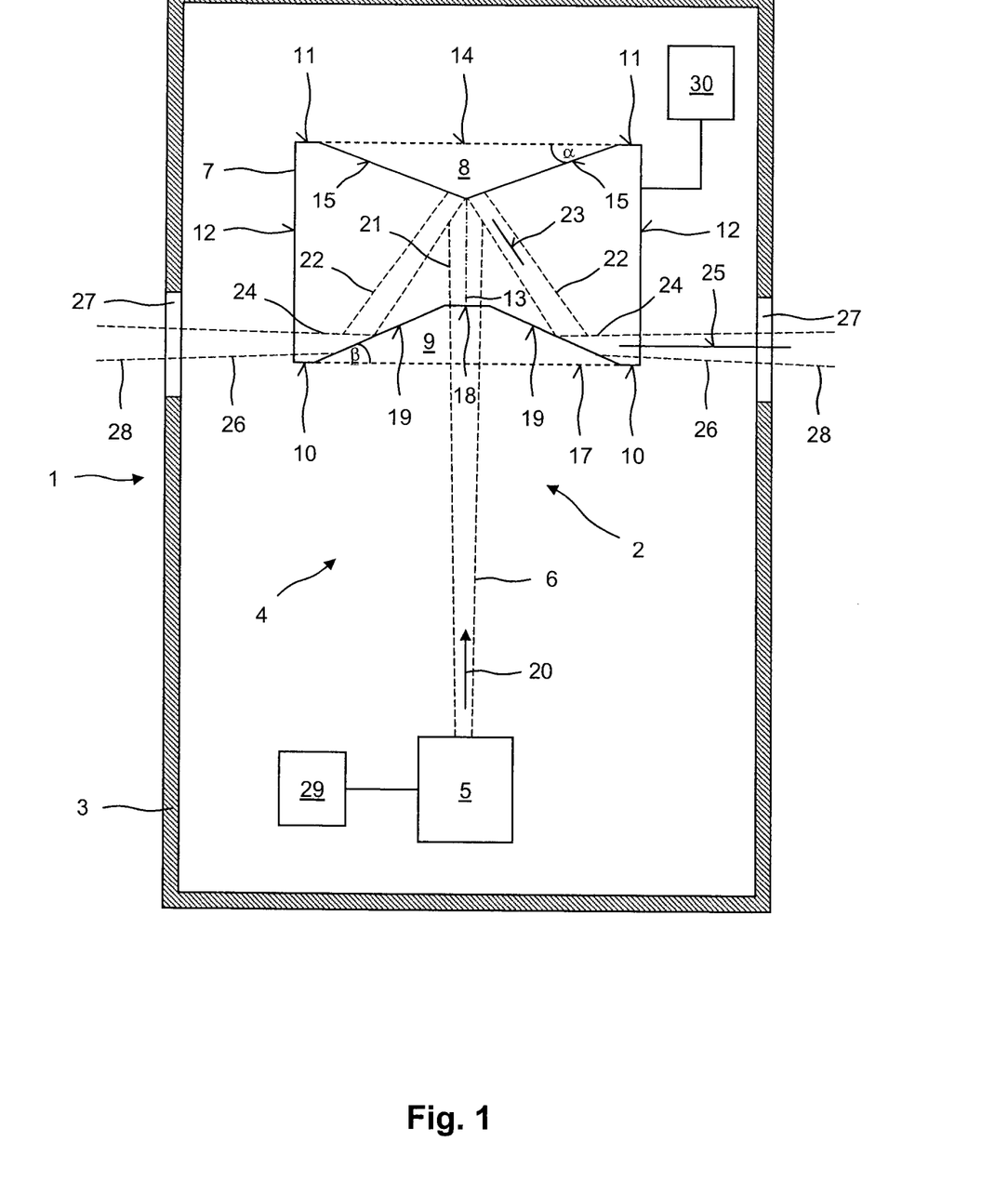
FIG. 1 illustrates a laser system having a first embodiment of an optical system according to the invention that is designed as a circular cylinder having a first cone-shaped cutout portion in the upper base and a second truncated-cone-shaped cutout portion in the lower base of the circular cylinder.

FIG. 1 shows a laser system 1 having a first embodiment of an optical system 2 according to the invention. The laser system 1 includes a housing 3 and a beam device 4 arranged in the housing 3 and comprising a beam source 5 and the shaping optics 2 according to the invention.

The beam source 5 is designed as a semiconductor laser that generates a primary laser beam 6 in the visible spectrum, for example a red laser beam having a wavelength of 635 nm or a green laser beam having a wavelength of 532 nm. Following emission of the primary laser beam 6 from the laser source 5, the divergence that takes place results in an expansion of the laser beam 6, that is to say, the beam diameter of the primary laser beam 6 increases in proportion with the distance of the laser beam 6 from the beam source 5.

Arranged in the optical path downstream of the beam source 5 is the optical system 2 according to the invention. The optical system 2 is designed as a base member in the form of a right circular cylinder 7 having a first cone-shaped cutout portion 8 and a second truncated-cone-shaped cutout portion 9. A circular cylinder is a cylinder that has a circular base.

A cylinder is bounded by two parallel, flat surfaces that are referred to as the lower and the upper base, and by a lateral surface. A cylinder is obtained by displacing a bounded surface lying in a plane along a straight line which does not lie in the plane and which defines the cylinder axis. In a right cylinder the cylinder axis extends perpendicular to the base, whereas the cylinder axis in an oblique cylinder is arranged at an angle of ≠90° relative to the base. The distance between the two planes in which the lower and upper bases lie defines the height of the cylinder.

The circular cylinder 7 comprises a circular lower base 10, a circular upper base 11 parallel to the lower base 10, and a lateral surface 12 connecting the lower and upper bases 10, 11. The lower and upper bases 10, 11 are arranged perpendicular and the lateral surface 12 parallel to a cylinder axis 13. The lateral surface 12 of the circular cylinder 7 forms an interface between the optical system 2 and the surrounding environment, the interface being designed as transmitting surface for the laser beam 6. The transmitting surface 12 is referred to also as an emergent surface for the laser beam.

The first cutout portion 8 provided in the base member 7 is designed in the shape of a right circular cone, and the second cutout portion 9 in the shape of a right truncated cone. A circular cone is a cone that has a circular base. A cone is a geometric object which is obtained when all points of a bounded surface lying in a plane are connected by straight lines to a point which lies outside the plane. The surface is referred to as the base, the bounding line of the base as the directrix, and the point as the cone vertex. The distance of the cone vertex from the base defines the height of the cone. The lines connecting the cone vertex to the directrix are referred to as the generatrices and the locus of the generatrices is referred to as the lateral surface of the cone. In a right cone that has a circular base the cone vertex lies on the cone axis that extends perpendicular to the base through the center point of the base, whereas the cone axis in an oblique circular cone extends outside the center point of the base. A truncated cone is obtained when a smaller cone is cut off from a right cone parallel to the base. The larger of the two parallel surfaces is referred to as the lower base and the smaller as the upper base. The distance between the lower and upper bases defines the height of the truncated cone. The third of the bounding surfaces of the truncated cone, which connects the lower base to the upper base, is referred to as the lateral surface.

The surface area of the first cone-shaped cutout portion 8 comprises a circular lower base 14 that is arranged in the upper base 11 of the base member 7 and a lateral surface 15 that abuts the lower base 14 and is arranged at an angle α to the lower base 14. The lateral surface 15 of the first cutout portion 8 forms an interface between the base member 7 and the surrounding environment, the interface being designed as a reflecting surface for the laser beam. The lateral surface 15 is referred to also as first reflecting surface for the laser beam.

The surface area of the second truncated-cone-shaped cutout portion 9 comprises a circular lower base 17 that is arranged in the lower base 10 of the base member 7, a circular upper base 18 that is parallel to the lower base 17, and a lateral surface 19 that connects the lower and upper bases 17, 18, and is arranged at an angle β to the lower base 17. The upper base 18 and the lateral surface 19 form additional interfaces between the base member 17 and the surrounding environment, the upper base 18 being designed as a transmitting surface and the lateral surface 19 as a reflecting surface for the laser beam. The transmitting surface 18 is referred to also as incident surface and the lateral surface 19 as second reflecting surface for the laser beam.

The divergent laser beam 6 propagates in a propagation direction 20 and impinges on the incident surface 18, through which the transmitted fraction passes as transmitted laser beam 21. The transmitted laser beam 21 propagates through the base member 7 and impinges on the first reflecting surface 15 which deflects the reflected fraction and reshapes the same into an at least segmentally ring-shaped laser beam 22. The ring-shaped laser beam 22 propagates in a propagation plane 23 and impinges on the second reflecting surface 19, which deflects the reflected fraction as a double reflected laser beam 24 in the direction toward the emergent surface 12. The laser beam 24 propagates in a propagation plane 25 and impinges on the emergent surface 12, through which the transmitted fraction passes as transmitted laser beam 26 and continues to propagate in the propagation plane 25. At the emergent surface 12 the laser beam is not deflected.

The angle α of the first reflecting surface 15 and the angle β of the second reflecting surface 19 are selected such that the primary laser beam 6 is deflected by the optical system 2 through 90° and the propagation plane 25 of the ring-shaped laser beam 26 extends perpendicular to the propagation direction 20 of the primary laser beam 6. The laser beam 26 is coupled out from the housing 3 through an output window 27 and impinges as coupled-out laser beam 28 on a wall, ceiling or other target object and may be used as a laser mark.

The visibility of the laser beam on a target object depends, among other things, on the intensity of the laser beam. It is therefore useful to adapt the opening angle of the laser mark to the measuring task, in order to utilize the available intensity. The opening angle of the coupled-out laser beam 28 can be adjusted via the field that the transmitted laser beam 21 illuminates on the first reflecting surface 15. If, for example, a line-shaped laser mark of 180° is needed, the transmitted laser beam 21 illuminates only half of the first reflecting surface 15. The opening angle of the coupled-out laser beam is adjustable by displacing the optical axis of the primary laser beam 6 and/or the cylinder axis 13 of the circular cylinder 7. An adjustment device 29 is provided for this purpose, whereby the position of the beam source 5 is adjustable in the propagation direction 20 of the primary laser beam 6 and/or in a plane perpendicular to the propagation direction 20 of the primary laser beam 6. Alternatively or additionally, a further adjustment device 30 is provided, whereby the optical system 2 is adjustable in the propagation direction 20 of the primary laser beam 6 and/or in the plane perpendicular to the propagation direction 20.

Figure 2:
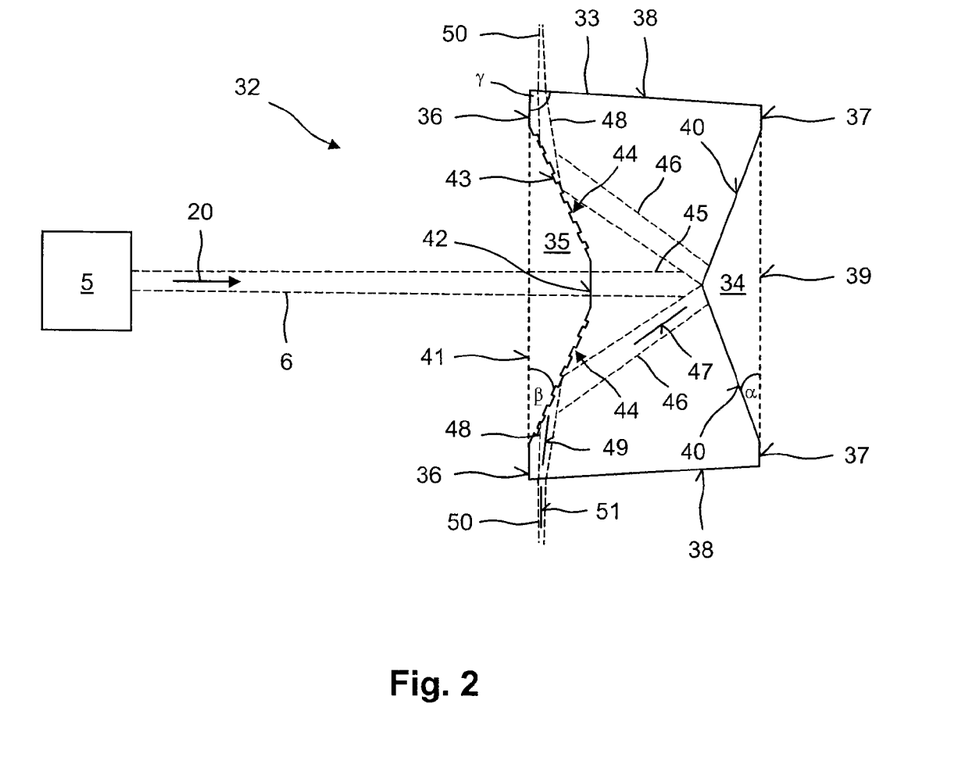
FIG. 2 illustrates a second embodiment of an optical system according to the invention, comprising a truncated-cone-shaped base member having a first cone-shaped cutout portion in the upper base and a second truncated-cone-shaped cutout portion in the lower base of the base member, a diffractive optical element for shaping the laser beam being integrated into the lateral surface of the second cutout portion.

FIG. 2 shows a second embodiment of the optical system 32 according to the invention, which is designed as a base member 33 in the shape of a right truncated cone having a first cone-shaped cutout portion 34 and a second truncated-cone-shaped cutout portion 35.

The truncated cone 33 comprises a circular lower base 36, a circular upper base 37 parallel to the lower base 36, and a lateral surface 38 that is arranged at an angle γ to the lower base 36 and which is designed for the laser beam as transmission surface in the form of an emergent surface. The surface area of the first cone-shaped cutout portion 34 comprises a circular lower base 39 which is arranged in the upper base 37 of the base member 33, and a lateral surface 40 which abuts the lower base 39 and is designed as first reflecting surface for the laser beam. The surface area of the second truncated-cone-shaped cutout portion 35 comprises a circular lower base 41, which is arranged in the lower base 36 of the base member 33, a circular upper base 42 which is parallel to the lower base 41 and which is designed for the laser beam as a transmitting surface in the form of an incident surface, and a lateral surface 43 which is designed as a second reflecting surface for the laser beam.

The optical system 32 comprises a further optical element 44 which is integrated in the form of a microstructured surface into the lateral surface 43 of the second truncated-cone-shaped cutout portion 35. The term "integrated" means that no interface exists between the base member 33 and the optical element 44. Microstructured surfaces are known also by the term "diffractive optical elements", abbreviated DOE. They function in principle like an optical grating and split an incident laser beam into different orders of diffraction, according to the angle. Diffractive optical elements have the advantage that they allow laser beams to be shaped into nearly any desired beam distribution. They are produced by photolithographic production methods and by scanning texturing methods, such as diamond turning, laser- or electron-beam writing.

The optical element 44 may, alternatively or additionally to the lateral surface 43 of the second truncated-cone-shaped cutout portion 35, be integrated into the upper base 42 of the second cutout portion 35, which upper base is designed as a transmitting surface, into the lateral surface 40 of the first cutout portion 34, which lateral surface is designed as a first reflecting surface, and/or into the lateral surface 38 of the base member 33, which lateral surface is designed as a transmitting surface.

The primary laser beam 6 impinges on the incident surface 42, through which the transmitted fraction passes as transmitted laser beam 45. The transmitted laser beam 45 propagates through the base member 33 and impinges on the first reflecting surface 40, at which the reflected fraction is deflected and reshaped into a ring-shaped laser beam 46. The ring-shaped laser beam 46 propagates in a propagation plane 47 and impinges on the second reflecting surface 43 which deflects the reflected fraction as a double reflected laser beam 48 in the direction toward the emergent surface 38. The laser beam 48 propagates in a propagation plane 49 and is shaped in a plane perpendicular to the propagation plane 49 by the diffractive optical element 44 that is integrated into the second reflecting surface 43. FIG. 2 shows an embodiment in which the laser beam 48 is focused perpendicular to the propagation plane 49, such that a sharp line-shaped laser mark is generated.

The laser beam 48 impinges on the emergent surface 38, through which the transmitted fraction passes as transmitted laser beam 50 and is deflected according to the angle of incidence at the emergent surface 38. The angle α of the first reflecting surface 40, the angle β of the second reflecting surface 43 and the angle γ of the emergent surface 38 are aligned relative to each other in such a way that the primary laser beam 6 is deflected by the optical system 32 through 90° and a propagation plane 51 of the laser beam 50 extends perpendicular to the propagation direction 20 of the primary laser beam 6.

Figure 3A:
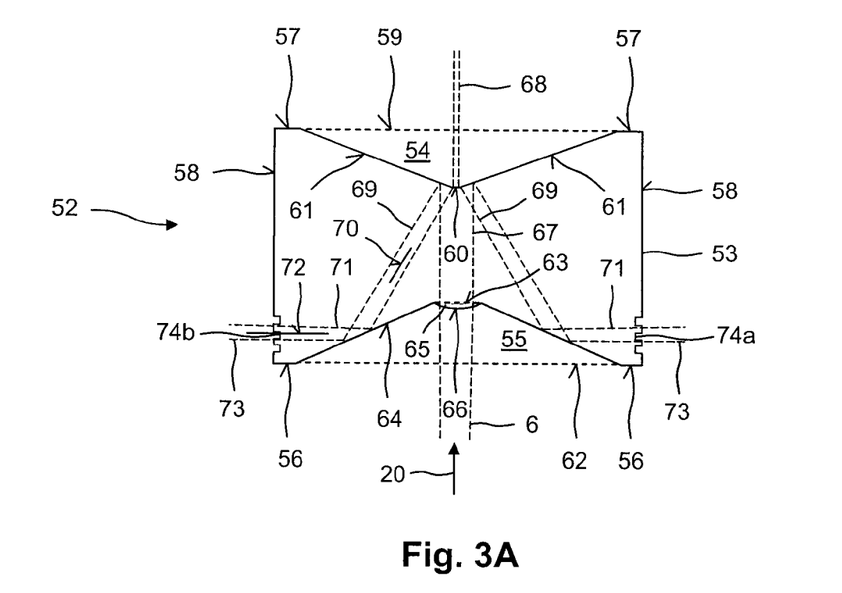
FIGS. 3A and 3B illustrate a third embodiment of an optical system according to the invention, comprising a cylindrical base member having a first and a second truncated-cone-shaped cutout portion, wherein two diffractive optical elements for shaping a ring-shaped laser beam in the propagation plane are integrated into the lateral surface of the base member, in a section parallel to the cylinder axis (FIG. 3A) and in a section perpendicular to the cylinder axis of the base member (FIG. 3B)
Figure 3B:
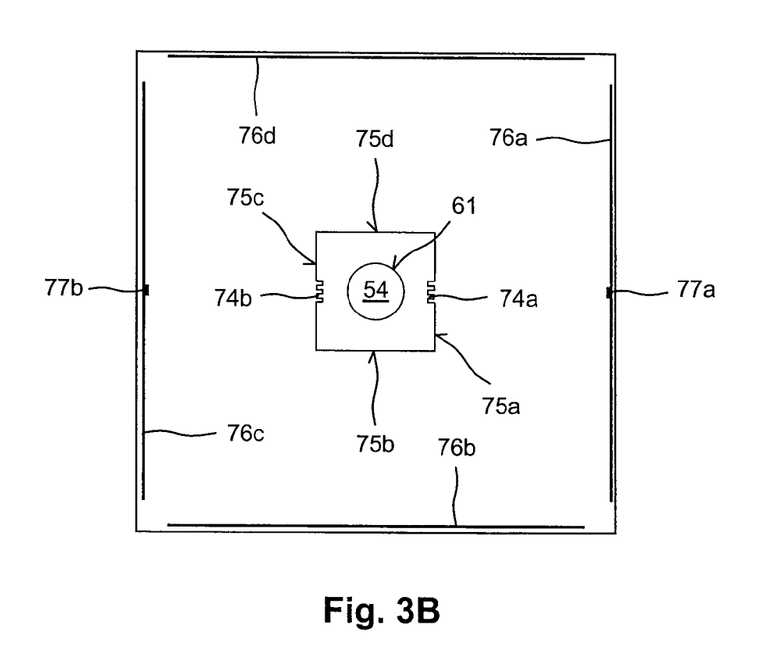

FIGS. 3A and 3B show a third embodiment of an optical system 52 according to the invention that is designed as a base member 53 in the shape of a cylinder having a first truncated-cone-shaped cutout portion 54 and a second truncated-cone-shaped cutout portion 55. The sectional view in FIG. 3A shows a section through the optical system 52 parallel to the cylinder axis of the base member 53 and FIG. 3B shows a section perpendicular to the cylinder axis.

The base member 53 comprises a quadratic lower base 56, a quadratic upper base 57 parallel to the lower base 56, and a lateral surface 58 which is designed for the laser beam as a transmitting surface in the form of an emergent surface. The surface area of the first cutout portion 54 comprises a circular lower base 59 that is arranged in the upper base 57 of the base member 53, an upper base 60 parallel to the lower base 59, and a lateral surface 61 abutting the lower and upper bases 59, 60 which is designed as a first reflecting surface for the laser beam. The surface area of the second cutout portion 55 comprises a circular lower base 62 that is arranged in the lower base 56 of the base member 53, a circular upper base 63 that is parallel to the lower base 62 and which is designed for the laser beam as a transmitting surface, and a lateral surface 64 which is designed as a second reflecting surface for the laser beam.

The optical system 52 has a further optical element 65 that is designed as collimating optics and directly abuts the upper base 63 of the second truncated-cone-shaped cutout portion 55. The term "directly abutting" means that the base member 53 and the collimating optics 65 have a common interface and no other optical element or medium having a different refractive index, such as for example air, is located between the optical surfaces of the two optical elements 53, 65. The collimating optics 65 are designed as an aspherically curved lens, and the surface area of the collimating optics 65 that faces away from the upper base 63 forms a transmitting surface for the laser beam 6 in the form of a curved incident surface 66. Alternatively, the collimating optics 65 may be integrated into the base member 53 and produced monolithically from one material. Suitable materials are, for example, glass and plastics. The aspheric curvature is created in glass for example by diamond turning, replicating, grinding and polishing, or by pressing at high temperatures from a glass blank, and in the case of plastic by injection molding or injection compression molding.

The primary laser beam 6 impinges on the incident surface 66 through which the transmitted fraction passes, and is shaped by the collimating optics 65 into a collimated laser beam 67. The collimated laser beam 67 propagates through the base member 53 and impinges with one part on the upper base 60 which is designed as a transmitting surface and allows the transmitted fraction to pass through in the form of a spot-shaped plumb beam 68, and with another part on the first reflecting surface 61 which deflects the reflected fraction and reshapes the same into a ring-shaped laser beam 69. The laser beam 69 propagates in a propagation plane 70 and impinges on the second reflecting surface 64 which deflects the reflected fraction as a double-reflected laser beam 71 in the direction toward the lateral surface 58 of the base member 53. The laser beam 71 propagates in a propagation plane 72 and impinges on the emergent surface 58, through which the transmitted fraction passes as transmitted laser beam 73. At the emergent surface 58 the laser beam 73 is not deflected and continues to propagate in the propagation plane 72.

The optical system 52 comprises two further optical elements which are designed in the form of a first and second diffractive optical element 74a, 74b and are integrated into the lateral surface 58 of the base member 53. The diffractive optical elements 74a, 74b form the ring-shaped laser beam 71 in a plane parallel to the propagation plane 72. The emergent surface 58 comprises four side surfaces 75a-75d of the base member 53. In a quadratic base the directional derivative of the bounding line is continuous in the area of the sides and not continuous in the area of the corner points. The side surfaces 75a-75d each generate on a target surface a corresponding line-shaped laser mark 76a-76d. The diffractive optical elements 74a, 74b are designed in such a way that the zero order of diffraction of the laser beam 71 generates on the target surface part of the line-shaped laser marks 76a, 76c, and the higher orders of diffraction, in particular the first order of diffraction, generate spot-shaped laser marks 77a, 77b.

Figure 4:
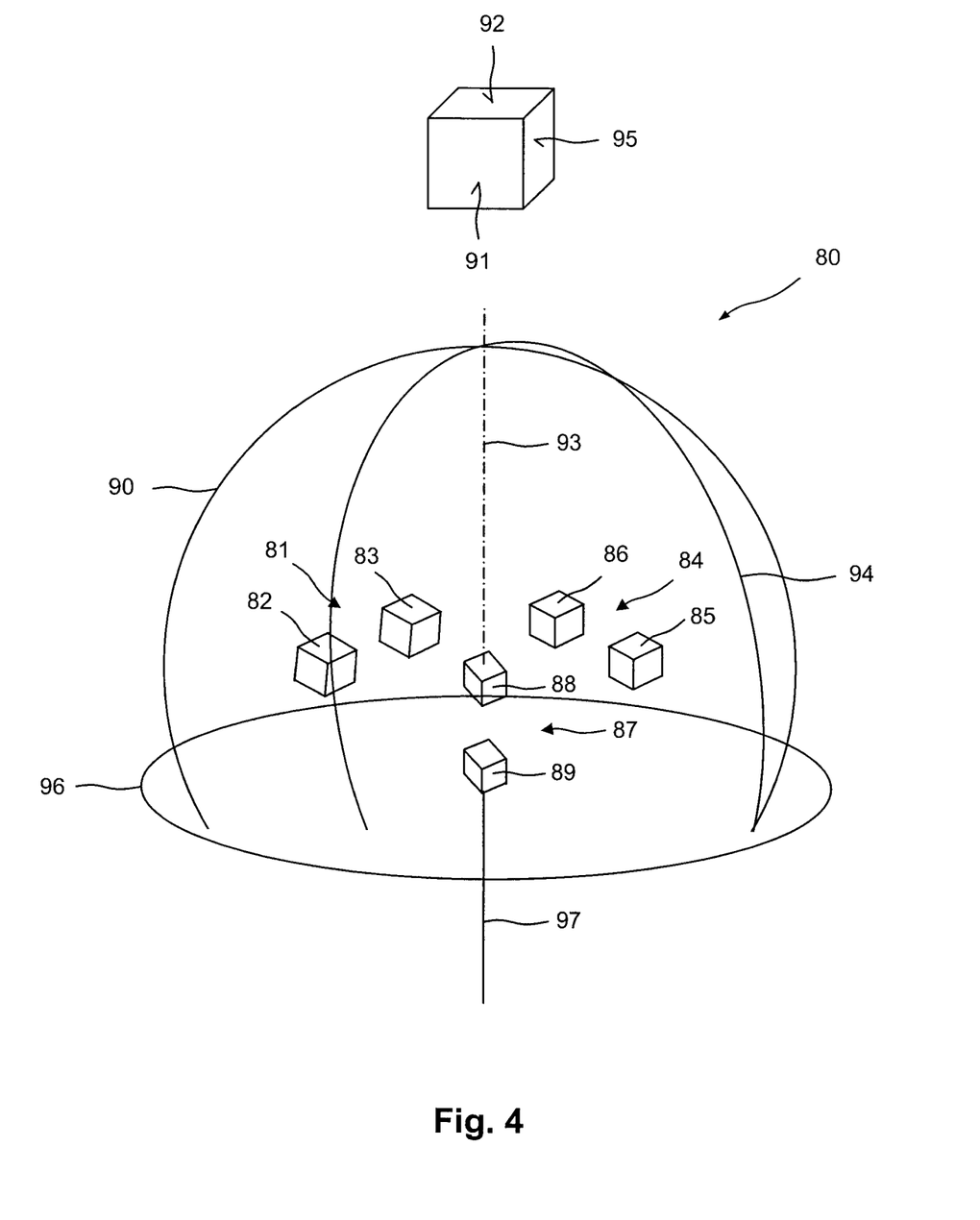
FIG. 4 illustrates a laser system comprising a first, second and third optical system that produce three ring-shaped laser beams that are arranged perpendicular to each other and one spot-shaped plumb beam.

FIG. 4 shows a laser system 80 according to the invention that generates three ring-shaped laser beams, which are referred to as ring beams, and one spot-shaped laser beam, which is referred to as spot beam.

The laser system 80 comprises a first beam device 81 having a first beam source 82 and a first optical system 83 according to the invention, a second beam device 84 having a second beam source 85 and a second optical system 86 according to the invention, and a third beam device 87 having a third beam source 88 and a third optical system 89 according to the invention. The optical systems 83, 86, 89 according to the invention correspond to one of the optical systems 2, 32, 52.

The first beam device 81 generates a first ring beam 90 that is arranged in a first vertical plane 91 and is referred to as first vertical ring beam. The first vertical plane 91 is arranged perpendicular to a horizontal plane 92. The orientation of the horizontal plane 92 is defined by a vertical direction 93 that is determined by the force of gravity.

The second beam device 84 generates a second ring beam 94 which is arranged in a second vertical plane 95 and which is referred to as second vertical ring beam. The second vertical plane 95 is arranged perpendicular to the horizontal plane 92 and perpendicular to the first vertical plane 91.

The third beam device 87 generates a third ring beam 96 which is arranged in the horizontal plane 92 and which is referred to as horizontal ring beam. The horizontal ring beam 96 is arranged perpendicular to the first and second vertical ring beams 90, 94. The third beam device 87 generates, in addition to the horizontal ring beam 96 a spot beam 97 that is oriented opposite to the vertical direction 93 and lies on the intersecting line of the two vertical ring beams 90, 94. The spot beam 97 may alternatively also be generated by an additional beam source.

As an alternative to the laser system 80 having three beam sources 82, 85, 88, it is possible for the laser system to have a single beam source. In this case the laser beam is divided into partial beams by beam splitters. The embodiment of a laser system having a single beam source is advantageous if the beam source provides sufficient power to make the ring beams visible on the substrate. A laser system having a single beam source can be designed to be more compact than a laser system in which three beam sources are arranged.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An optical system for shaping a laser beam, comprising: a first optical element, including:
    a base member with a lower base, an upper base, and a lateral surface abutting the lower base and the upper base, wherein the lateral surface includes a transmitting surface for the laser beam;
    wherein the base member includes a first cutout portion with a lower base arranged in the upper base of the base member and a lateral surface, wherein the lateral surface of the first cutout portion includes a first reflecting surface for the laser beam and wherein an at least segmentally ring-shaped laser beam is generatable by the lateral surface of the first cutout portion;
    wherein the base member includes a second cutout portion with a lower base arranged in the lower base of the base member, an upper base, wherein the upper base of the second cutout portion includes a transmitting surface for the laser beam, and a lateral surface abutting the lower base and the upper base of the second cutout portion, wherein the lateral surface includes a second reflecting surface for the at least segmentally ring-shaped laser beam; and
    a second optical element for shaping the at least segmentally ring-shaped laser beam, wherein the second optical element is integrated into the lateral surface of the base member, the lateral surface of the first cutout portion, or the lateral surface of the second cutout portion.

2. The optical system according to claim 1, wherein the second optical element is a diffractive optical element.

3. The optical system according to claim 1, wherein the at least segmentally ring-shaped laser beam is shapeable in a plane perpendicular to a propagation plane of the at least segmentally ring-shaped laser beam by the second optical element.

4. The optical system according to claim 1, wherein the at least segmentally ring-shaped laser beam is shapeable in a plane parallel to a propagation plane of the least segmentally ring-shaped laser beam by the second optical element.

5. The optical system according to claim 1, wherein the first cutout portion includes an upper base parallel to the lower base of the first cutout portion and wherein the upper base includes a transmitting surface for the laser beam.

6. A laser system, comprising:
    a beam source, wherein a laser beam is generatable by the beam source; and
    an optical system in accordance with claim 1.

7. The laser system according to claim 6, further comprising an adjustment device, wherein a position of the beam source relative to the optical system or a position of the optical system relative to the beam source is adjustable in a propagation direction of the laser beam or in a plane perpendicular to the propagation direction of the laser beam by the adjustment device.

8. The laser system according to claim 6, wherein a first at least segmentally ring-shaped laser beam is generatable by the optical system, and further comprising a second optical system wherein a second at least segmentally ring-shaped laser beam is generatable by the second optical system.

9. An optical system for shaping a laser beam, comprising: a first optical element, including:
    a base member with a lower base, an upper base, and a lateral surface abutting the lower base and the upper base, wherein the lateral surface includes a transmitting surface for the laser beam;
    wherein the base member includes a first cutout portion with a lower base arranged in the upper base of the base member and a lateral surface, wherein the lateral surface of the first cutout portion includes a first reflecting surface for the laser beam and wherein an at least segmentally ring-shaped laser beam is generatable by the lateral surface of the first cutout portion;

wherein the base member includes a second cutout portion with a lower base arranged in the lower base of the base member, an upper base, wherein the upper base of the second cutout portion includes a transmitting surface for the laser beam, and a lateral surface abutting the lower base and the upper base of the second cutout portion, wherein the lateral surface includes a second reflecting surface for the at least segmentally ring-shaped laser beam; and a second optical element for shaping the at least segmentally ring-shaped laser beam, wherein the second optical element directly abuts the lateral surface of the base member.

10. The optical system according to claim 9, wherein the at least segmentally ring-shaped laser beam is shapeable in a plane perpendicular to a propagation direction of the at least segmentally ring-shaped laser beam by the second optical element.

* * * * *